(12) United States Patent
Rhodes et al.

(10) Patent No.: US 10,936,444 B2
(45) Date of Patent: Mar. 2, 2021

(54) SMART DYNAMIC RESTORE FOR KUBERNETES BASED APPLICATIONS

(71) Applicant: EMC IP Holding Company LLC, Hopkinton, MA (US)

(72) Inventors: Michael Rhodes, Stamford, CT (US); Assaf Natanzon, Tel Aviv (IL); Luay Al-Alem, Lynnfield, MA (US); Antony Bett, Shrewsbury, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 88 days.

(21) Appl. No.: 16/172,358

(22) Filed: Oct. 26, 2018

(65) Prior Publication Data

US 2020/0133795 A1 Apr. 30, 2020

(51) Int. Cl.
*G06F 11/14* (2006.01)
*G06F 9/455* (2018.01)
*H04L 12/24* (2006.01)
*H04L 29/08* (2006.01)

(52) U.S. Cl.
CPC ...... *G06F 11/1469* (2013.01); *G06F 9/45558* (2013.01); *G06F 11/1464* (2013.01); *H04L 41/5096* (2013.01); *H04L 67/10* (2013.01)

(58) Field of Classification Search
USPC .................. 711/162; 714/4.11, 6.1
See application file for complete search history.

(56) References Cited

U.S. PATENT DOCUMENTS

| | | | |
|---|---|---|---|
| 10,656,929 B2 | 5/2020 | Jamjoom et al. | |
| 10,705,868 B2 | 7/2020 | Bailey et al. | |
| 2017/0046146 A1* | 2/2017 | Jamjoom | G06F 8/62 |
| 2017/0364434 A1 | 12/2017 | Kairali et al. | |
| 2018/0034839 A1 | 2/2018 | Ahuja et al. | |
| 2019/0238636 A1* | 8/2019 | Li | G06F 9/5088 |
| 2019/0312900 A1 | 10/2019 | Ahuja et al. | |
| 2019/0340059 A1 | 11/2019 | Bagarolo et al. | |
| 2019/0347168 A1* | 11/2019 | Giannetti | G06F 9/485 |

OTHER PUBLICATIONS

U.S. Appl. No. 16/155,789, filed Oct. 9, 2018, Luay Al-Alem et al.
U.S. Appl. No. 16/155,789, filed Apr. 16, 2020, Office Action.

* cited by examiner

*Primary Examiner* — Ilwoo Park
(74) *Attorney, Agent, or Firm* — Workman Nydegger (57) ABSTRACT

One example method includes discovering an application topology, discovering relationships between microservices that are elements of the application topology, ranking the microservices, identifying one or more of the microservices as a persistency microservice, selecting one or more persistency microservices for backup, and defining a backup policy based on the microservice relationships, the microservice rankings, and the selected persistent microservices. A backup operation is then performed that includes backing up persistent data and/or persistent metadata generated and/or modified by one or more of the persistency microservices.

19 Claims, 6 Drawing Sheets

SMART DYNAMIC RESTORE FOR KUBERNETES BASED APPLICATIONS

RELATED APPLICATIONS

This application is related to U.S. patent application Ser. No. 16/155,789, entitled AUTOMATICALLY SETTING A DYNAMIC RESTORE POLICY IN A NATIVE CLOUD ENVIRONMENT, filed Oct. 9, 2018 (the "'789 application"). All of the aforementioned applications are incorporated herein in their respective entireties by this reference.

FIELD OF THE INVENTION

Embodiments of the present invention generally relate to data security and availability. More particularly, at least some embodiments of the invention relate to systems, hardware, software, computer-readable media, and methods directed to smart dynamic restore processes for microservices. Embodiments of the invention may be employed in cloud computing environments, though that is not necessarily required.

BACKGROUND

Cloud native applications, which typically comprise a group of one or more microservices, use significantly higher amount of different persistency microservices compared to classical applications. The main reason is the ease of adding new microservices to the code of the cloud native application. For example, adding a new type of data base for a specific task can be done within minutes of coding and configuration compared to prior methods where these processes were often time consuming.

Kubernetes, for example, is becoming a very popular container management platform and it helps applications run across nodes, clusters and clouds. With the rise of service meshes, discovering a Kubernetes backed application becomes much easier and much more powerful. This can allow discovery of which microservices are used and need to be backed up, but also which microservices are used more frequently, and which persistency layers are more important compared to others. Since such systems are required to be agile and support self-healing, changes are needed in the way a cloud native application is restored after a failure. However, certain problems remain unresolved.

For example, Kubernetes based applications typically use large amounts of storage microservices. This may mean that a failure of one persistency microservice does not necessarily mean all microservices need to be restored. As well, some parts, that is, microservices, of a cloud native application may more important than other microservices. Thus, even if it were possible to discover the application of which the microservices are a part, it may still be difficult to determine what the most important pieces of that particular application are. In some cases, every microservice may be important, but in most cases, some specific microservices will be more important than others. For example, it might be true in some cases that a user facing microservice is more important than a non-user facing microservice. This means that when restoring backend microservices from backup, it may be more important to restore some backend microservices before restoring others.

Yet another consideration that may complicate restore operations is that not all persistency microservices are used in the same frequency and with the same workload. As well, not all persistency microservices are used at the same time. For example, some databases may only be used during end of month workload. Finally, not all persistency microservices are used at the same time. Thus, detection of a microservice failure may only happen long after the microservice has failed.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data security and availability. More particularly, at least some embodiments of the invention relate to systems, hardware, software, computer-readable media, and methods directed to smart dynamic restore processes for microservices. Embodiments of the invention may be employed in cloud computing environments, though that is not necessarily required. At least some specific embodiments are concerned with smart dynamic restore processes for Kubernetes based cloud native applications, although the scope of the invention is not so limited.

Cloud native applications may be developed using a microservices architecture. In a microservice architecture, an application comprises a suite of a small independently deployable modular services, sometimes referred to as microservices. Microservices may also be referred to herein simply as 'services.' Each microservice runs a unique process and may communicate with other microservices, depending on the requirements of the application. As well, because the microservice is not specific to any particular application, the functionality of that microservice can be employed by multiple different applications. Due to the number of different microservices, and what may be complicated relationships among them, a service mesh may be provided that takes the form of a dedicated infrastructure layer for handling service-to-service communication. The service mesh is responsible for the reliable delivery of requests through the complex topology of services that may comprise a modern, cloud native application.

In at least some instances, Kubernetes based applications, and other applications, may provide for a persistent volume or other persistent storage to be attached to a container in which a microservice of the application runs. The persistent volume may store persistent data generated by, and/or otherwise associated with, the microservice. Metadata associated with the persistent data may also be stored in the persistent volume. Microservices that generate persistent data and/or are associated with persistent storage may be referred to herein as persistency microservices.

At least some example embodiments of the invention are concerned with creation of an automated backup policy for microservices that generate persistent data. In general, an example backup policy may extend to any one or more of: the microservice itself; the persistent data; and the metadata associated with the persistent data. Initially, an application detection mechanism, such as the Istio service mesh for example. As explained in Appendix A hereto (see below), Istio is a service mesh which allows managing and monitoring networking between containers. The service mesh can be used to detect applications since application components communicate with each other. The service mesh can also be used to detect connectivity to services, and can be used to detect which persistent volumes and which services belong to a single particular application. The system can than create a backup plan which will back up all the persistent data of one or more of the microservices of the application, along with the metadata related to the microservices which build the application, and the configuration of the application. Being able to discover the importance of each microservice can lead to a different backup policy for each microservice. For example, persistent data of relatively important microservices may be backed up once an hour, while persistent data of less important services may be backed up every day. Backup policies such as these examples can lead to less storage use and less load on the protection storage.

Yet other example embodiments of the invention extend to creation and implementation of dynamic restore policies, such as may be employed with respect to backed up microservices, persistent data, and metadata, for example. In general, once a backup policy is created, such as briefly described above, and a ranking of the relative importance of the persistency microservices is detected, a smart restore policy can be created. Some elements of example restore policies include restoration in order of relative importance, restoration of only the parts necessary to be restored, and detecting when a restore is needed. In at least some embodiments, the example restore procedures disclosed herein may enable self-healing in the system, that is, the recovery from a failure before the failure has a material effect on the system.

Advantageously then, embodiments of the invention may provide various benefits and improvements relative to conventional hardware, systems and methods. To illustrate, embodiments of the invention may improve the operation of a computing system, and element of a computing system, by creating automated backup policies for microservices, persistent data, and metadata, based on established criteria. Among other things, this approach eliminates the need for manual implementation of backup policies. Because the backup policy can be implemented on a per-microservice basis, a high degree of backup customization is provided by embodiments of the invention. Further, because backup policies may take into account considerations such as the relative importance of various microservices and their associated persistent data and metadata, such backup policies may lead to a reduction in storage use and a reduced load on data protection storage in the system.

As well, embodiments of the invention may improve upon the operation of computing systems, and elements of computing systems, by enabling the creation and use of automatic restore processes for microservices, which may be interdependent. Such embodiments of the invention may provide a degree of granularity in their application, such that only those microservices that need to be restored are touched by the restore process. This functionality may be particularly useful in cloud native microservice applications, as the relations between and among microservices may be extensive, and complex. Further, embodiments of the invention may advantageously employ service mesh connections in defining and implementing microservice restore processes. As well, by automatically implementing a granular restore process for microservices, embodiments of the invention improve the reliability of cloud native applications, and may also reduce the load on system resources involved in the restore process.

Further information specific to the example Istio platform and Kubernetes platform, respectively, is disclosed in Appendix A hereto. Appendix A, which forms a part of the present disclosure, is incorporated herein in its entirety by this reference.

A. Aspects of Example Operating Environments

The following is a discussion of aspects of example operating environments for various embodiments of the invention. This discussion is not intended to limit the scope of the invention, or the applicability of the embodiments, in any way.

In general, example embodiments may be employed in connection with any computing environment in which one or more applications, and associated microservices, are deployed. Thus, while this disclosure refers to certain illustrative embodiments and associated computing environments, the scope of the invention is not limited to any particular type, configuration, or use, of computing environment.

Some particular example embodiments may be employed in connection with cloud computing environments, one example of which is a cloud data protection environment which can implement backup, archive, restore, and/or disaster recovery, functions. In at least some of these embodiments, the microservices may comprise elements of one or more different cloud native applications. Thus, as used herein, a 'cloud native application' embraces any application that comprises one or more microservices and is configured to operate in a cloud computing environment that may, or may not, take the form of a cloud data protection environment. The applications and microservices deployed in a cloud data protection environment, such as a cloud datacenter for example, may perform various functions. For example, one or more such applications and associated microservices may perform part, or all, of a backup process, a restore process, and/or any other service provided by, or otherwise associated with, a cloud storage environment.

In some alternative embodiments, a data protection environment may take the form of a remote cloud storage environment, an on-premises storage environment which may or may not be in the form of a cloud storage environment, and hybrid storage environments that include public and private elements, and/or that include local and remote elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

Any of the devices, including clients, servers, and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

Figure 1:
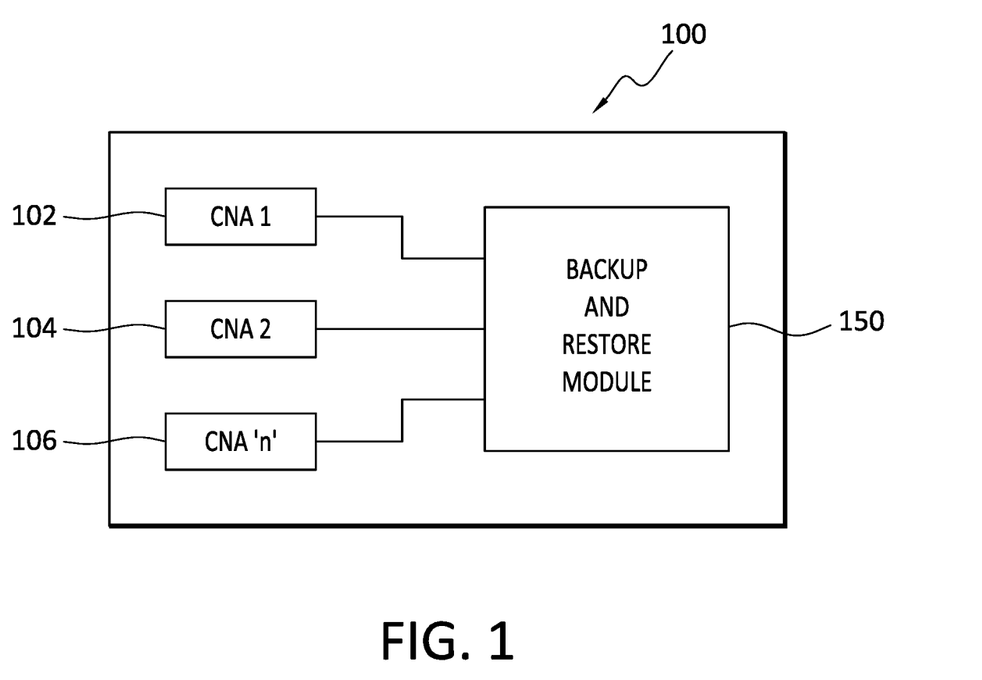
FIG. 1 discloses aspects of an example operating environment for some embodiments of the invention.

With particular attention now to FIG. 1, an operating environment 100, which may take the form of a cloud computing environment for example, may be associated with any number of cloud native applications, such as CNA1 102, CNA2 104, and CNAn 106, for example. The cloud native applications 102 . . . 106 may, or may not, be hosted by one or more host devices, one example of which is disclosed in FIG. 6, discussed below.

These cloud native applications 102 . . . 106 are not limited to the performance of any particular function(s). In some example embodiments, the operating environment 100 may be, or comprise, a cloud datacenter, and as such, the cloud native applications 102 . . . 106 may be involved in cloud datacenter operations such as backup and/or restore operations, for example. By virtue of their nature, the cloud native applications 102 . . . 106 may be able to rapidly scale their resource usage up and down according to demand. As well, embodiments of the cloud native applications 102 . . . 106 may be stateless, inasmuch as they are not tied to any particular infrastructure resources, whether hardware or software, in the operating environment 100.

In some particular embodiments, one or more of the cloud native applications 102 . . . 106 may be a Kubernetes based application, although that is not necessarily required. One or more of the cloud native applications 102 . . . 106 may comprise one or more microservices that run in a container and are associated with a persistent volume attached to that container.

With continued reference to FIG. 1, the operating environment 100 may include a backup and restore module 150. In general, and as discussed in more detail elsewhere herein, the backup and restore module 150 may, among other things, be operable to automatically generate a backup policy and a restore policy, as well as implement, or direct the implementation of, the backup policy and the restore policy to automatically identify, backup, and restore, one or more microservices associated with one or more of the cloud native applications 102 . . . 106. As well, although not required, the backup and restore module 150 may store microservice backups, persistent data backups, and metadata backups, so that, in the event of the failure of a microservice, the backed up microservice, persistent data, and metadata, can be restored by the backup and restore module 150. The microservice backups, persistent data backups, and metadata backups, may, more generally, be stored in any other location where they are accessible by the backup and restore module 150. In some embodiments, the backup and restore module 150 may be hosted in a cloud computing environment, such as a cloud datacenter for example. However, this is not required and the backup and restore module 150 may be hosted elsewhere.

As discussed in connection with FIG. 1, backup and restore functionality may be implemented in a single entity such as the backup and restore module 150 for example. However, the scope of the invention is not limited to any particular functional allocation. Thus, in an alternative embodiment, the backup functionality and the restore functionality may be implemented by different respective entities.

B. Aspects of Example Service Meshes

As used herein, a service mesh refers to a dedicated infrastructure layer for handling service-to-service communication, that is, communications between/among microservices. The service mesh is responsible for the reliable delivery of requests through the complex topology of services that comprise a cloud native application. An example of a service mesh that may be employed in connection with embodiments of the invention is the service mesh technology provided by Istio. In addition to the following discussion, Appendix A hereto also includes information concerning service meshes and associated functionality.

The term service mesh is sometimes used to describe the network of microservices that make up cloud native applications, and the interactions between those cloud native applications. As a service mesh grows in size and complexity, it can become harder to understand and manage. Service mesh requirements can include discovery, load balancing, failure recovery, metrics, and monitoring, and often more complex operational requirements such as A/B testing, canary releases, rate limiting, access control, and end-to-end authentication.

In some circumstances, a service mesh platform may provide a suitable solution to satisfy the diverse requirements of microservice applications by providing behavioral insights and operational control over the service mesh as a whole. For example, the Istio platform and/or other service meshes may provide a number of useful capabilities uniformly across a network of microservices.

One such capability concerns traffic management. A service mesh may operate to control the flow of traffic and application program interface (API) calls between services, make calls more reliable, and make the network more robust in the face of adverse conditions. Another such capability is observability. That is, a service mesh may be used to help gain an understanding of the dependencies between services and the nature and flow of traffic between the services, thus providing the ability to quickly identify issues. A further capability is policy enforcement. Thus, a service mesh may apply organizational policy to the interaction between services, and ensure that access policies are enforced and resources are fairly distributed among consumers. Policy changes may be made by configuring the mesh, not by changing application code. Yet another capability of some service mesh implementations is service identity and security. That is, services associated with the service mesh are provided with a verifiable identity and provide the ability to protect service traffic as it flows over networks of varying degrees of tractability.

In addition to the aforementioned capabilities, a service mesh may be designed for extensibility to meet diverse deployment needs. For example, the service mesh may operate with a variety of different environments and platforms, such as environments that span Cloud, on-premise, Kubernetes, and Mesos for example. Embodiments of the invention may be employed in connection with any of these environments. As well, a service mesh may provide for integration and customization. That is, a policy enforcement component can be extended and customized to integrate with existing solutions for access control lists (ACL), logging, monitoring, quotas, auditing and more.

Service mesh capabilities such as the examples noted may greatly decrease the coupling between application code, the underlying platform, and policy. This decreased coupling not only makes services easier to implement, but also makes it simpler for operators to move application deployments between environments or to new policy schemes. Applications may become inherently more portable as a result.

C. Example Microservice Topology and Related Processes

As noted, some example embodiments are concerned with application recovery, or restore, processes. Such example embodiments may employ service meshes to detect application pieces and to monitor the activity of each persistency service. In this way, a determination can be made as to which parts of the application need to be backed up automatically, and thus avoid user errors and provide for automated application level data protection.

In brief, this approach may employ a variety of processes. Initially, a combination of the platform API, such as the Kubernetes API for example, and a service mesh API, such as the Istio API for example, to discover, in real time, both the microservices and how they are connected to each other. Next, the interconnected microservices may be prioritized and ranked to determine what the most important pieces are. A decision may then be made as to which piece, or pieces, of the application are persistent, and should therefore be backed up for possible later restoration. Finally, a backup policy may be created that is based on the importance of the related microservice. To illustrate, in some cases, all the persistent services may need to be backed up together. In at least some cases however, relatively important pieces of the microservices may need a much higher frequency of backup than relatively less important pieces of the microservices.

Figure 2:
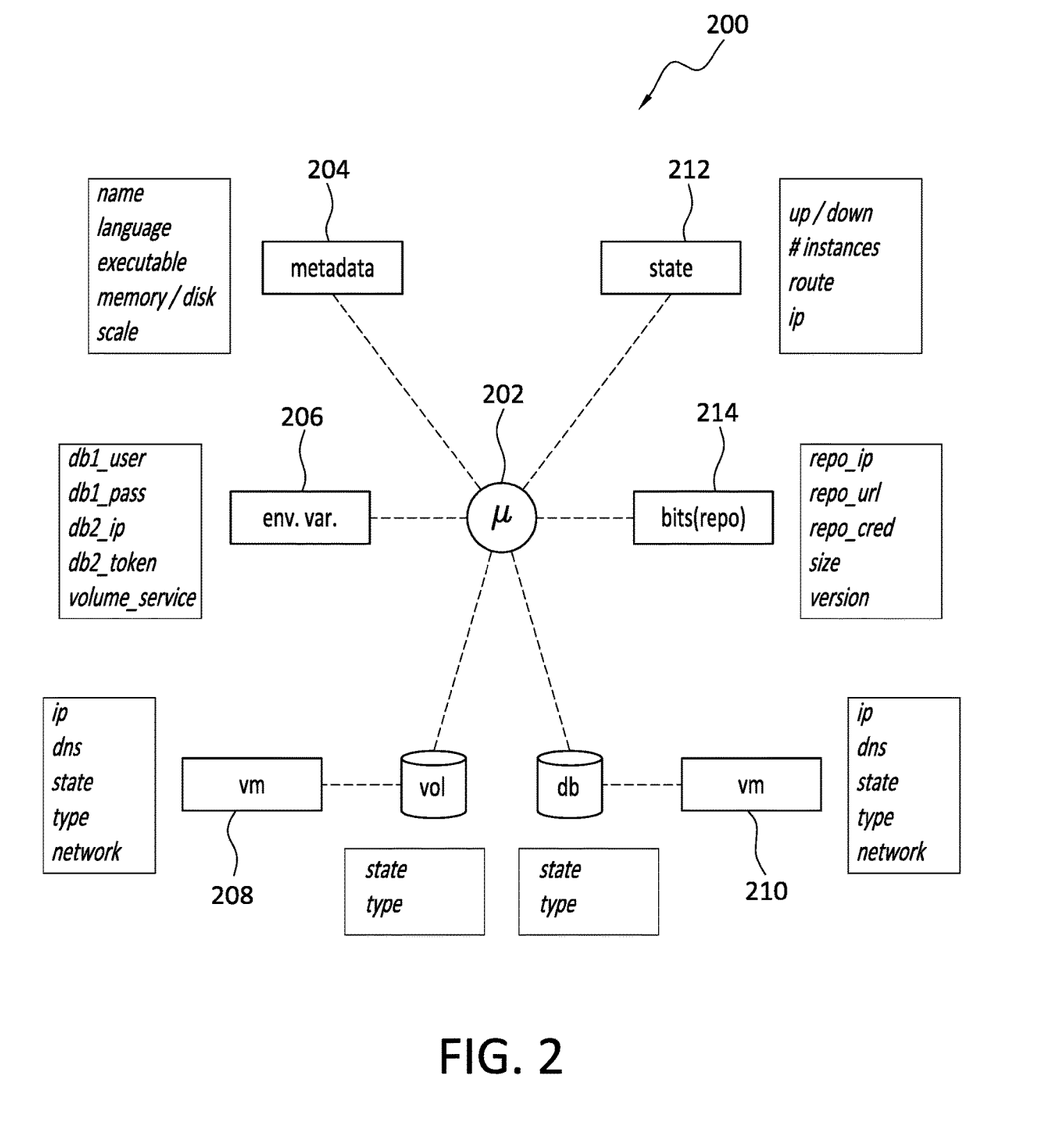
FIG. 2 discloses aspects of an example microservice topology and associated elements.

With attention now to FIG. 2, details are provided concerning aspects of an example microservice 200 topology. While not necessarily required, microservices often comprise one or more of the following parts or elements: a container image 202; container metadata 204; environment variables 206, such as how to access the microservice, database (DB) credentials, and IP addresses; attached storage such as persistent volumes 208; remote services 210 such as databases and message systems; platform configuration information 212 such as scale, and state, that is, is the container running or not, how many instances are running, and the IP addresses for the containers; host details that indicate where the containers are running; ingress and egress traffic; repository, or repo, information 214 indicating where the code and container .exe file are stored; as well as VOL/DB information that include address and access information for the persistent volumes and databases (DB).

Many, or all, of the microservice elements, such as container metadata, environment variables, attached storage, platform configuration and host details can all be extracted from the platform API. For example, with the Kubernetes API, a GET can be executed and will return microservice information such as container details such as the name and location of the container, container metadata, attached storage such as persistent volumes, and the platform confirmation details, such as the number of container instances, CPU/memory requirements, and other details.

In example embodiments, such platform APIs may be monitored to identify any changes in the state of these microservices, such as failed pods or increase/decrease in scale factors). The monitoring may also identify new/deleted microservices, as well as microservices that have been updated, such as by way of rolling upgrades or blue/green deployments, for example. If changes are discovered, then the application topology may need to be modified.

While the platform API may provide various useful functionalities, examples of which are noted above, application discovery may not provide enough information, in some instances at least, to enable backup and restore processes. For example, the platform API may not indicate how each microservice connects, or is otherwise related, to the other microservices of the application.

Thus, it is useful in some embodiments to augment the application discovery, implemented by the platform API, with the use of a service mesh. Among other things, the service mesh APIs may be queried to identify the relationships, if any, among the microservices of a cloud native application. For example, using a service mesh API, the routes of all traffic to and from interconnected microservices may be determined. A stream listener of the service mesh may listen to all the routes that flow through all of the microservices on the platform. Using information obtained by the stream listener, the entire application topology may be created. The application topology can then be constantly updated in real time as changes occur, such as the movement of microservices, addition/deletion/updating of microservices, and the turning on/off of microservices.

Once the application topology has been captured, a determination can then be made as to the relative importance of each of the microservices that make up the application. For example, using a service mesh and, if necessary, a load balancer, a determination can be made as to which microservices are user-facing, that is, which microservices have a graphical user interface, or an application programming interface, for example. One example of a way to do this is by monitoring ingress traffic to the platform and determining what microservice(s) that traffic initially hits. With this initial discovery of user-facing services, the service mesh can then be used to determine the services that connect to user-facing services and those that are lower level in the system. The services can then be labeled as appropriate.

Figure 3:
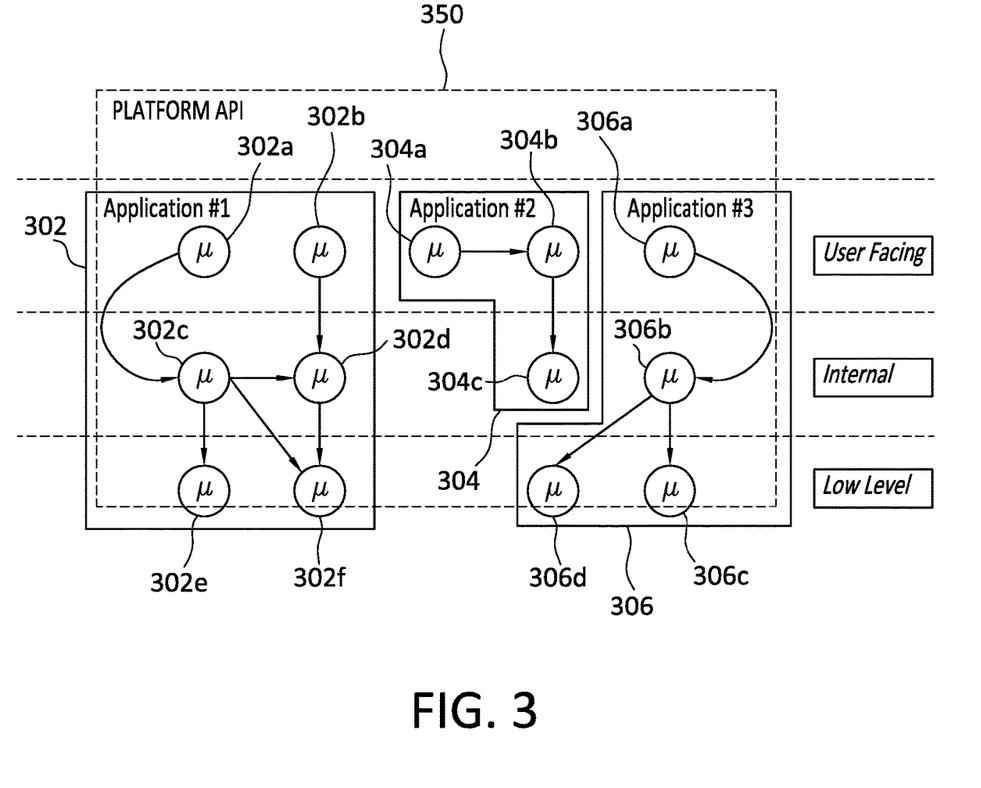
FIG. 3 discloses aspects of some example applications and microservice relationships.

FIG. 3 provides an illustrative example. In FIG. 3, various applications 302, 304, and 306, are indicated. One, some, or all, of the applications 302 . . . 306 may be a cloud native application. The applications 302 . . . 306 may be accessible by a platform API 350, such as the Kubernetes API for example. No particular platform API is required however.

The application 302 includes six different microservices, namely, microservices 302*a*, 302*b*, 302*c*, 302*d*, 302*e*, and 302*f*. The application 304 includes three different microservices, namely, microservices 304*a*, 304*b*, and 304*c*. Finally, the application 306 includes four different microservices, namely, microservices 306*a*, 306*b*, 306*c*, and 306*d*. While not specifically indicated in the example of FIG. 3, a microservice may be an element of multiple different applications. Put another way, multiple applications may share one or more microservices.

In the example of FIG. 3, the microservices of one or more of the applications 302 . . . 306 may be categorized in any of a variety of ways that may be useful in defining a back policy and/or a restore policy. For example, the microservices 302a . . . 302f may be characterized in terms of their importance, and/or based on other characteristics, relative to one or more other microservices of the application 302. The same is likewise true with respect to microservices 304a . . . 304c, and microservices 306a . . . 306d.

Thus, in some example embodiments, it may be assumed that one or more user-facing microservices, such as microservices 302a and 302b for example, are more important than a non-user-facing microservice, such as the internal microservices 302c, 302d, 302e and 302f. For example, in the case of an error on the system, it might make more sense to restore the user-facing microservice(s) first, and then the lower level microservice(s). This example restore protocol would provide the user with their standard interface, possibly with a human-readable error message, until the other services in the application are restored.

With continued reference to the example of FIG. 3, it may be assumed or decided that microservices 304a and 304b are relatively more important than microservice 304c. Similarly, it may be assumed or decided that microservice 306a is more important than microservice 306b which, in turn, may be deemed to be relatively more important than microservices 306c and 306d. As well, it may be assumed or decided that microservices 302c and 302d are more important than microservices 302e and 302f. As further indicated in the example of FIG. 3, it may be assumed or decided that one or more microservices have the same importance level, and/or share some other characteristic, as one or more other microservices. To illustrate, microservices 302a and 302b are both user-facing and, as such, may have the same relative importance.

As noted, the microservices of an application may be categorized, prioritized, and/or evaluated, in any of a variety of different ways that may be useful in defining a back policy and/or a restore policy for that application. In some embodiments, monitoring service meshes adds the capability to determine how much traffic is going towards the various microservices. This information may be used to rank the various microservices in terms of their relative importance to each other. For example, a first microservice that gets one million hits per hour is likely more important than a second microservice that gets 10 hits per day. Thus, as between these two example microservices, a restore policy may specify that the first microservice should be restored first.

As a final example, the relative importance of a microservice may be determined with reference to any interdependency relationships that microservice has with respect to one or more other microservices. With reference to the example of FIG. 3, the nature of the application 302, for example, is such that microservice 302c and 302d are interdependent with microservice 302f. In contrast, microservice 302a is not dependent upon any other microservices.

It should be noted that as used herein, interdependency embraces, at least, the notion that two or more microservices may be functionally related in some way and one of the microservices may not be able to correctly, or completely, operate unless the other associated microservice is also functioning properly. As another example, interdependency of microservices may also, or alternatively, embrace the notion that in order for one microservice to perform its operation(s), it is first necessary that another microservice have performed its respective operation(s). More generally, a lack of interdependency between two microservices reflects that these microservices can each operate fully and independently of the other, even if the other microservice were to fail.

In the case of the application 302, it may make sense in, at least in some circumstances, to restore microservice 302a first, since that microservice is not dependent upon any other microservices and, as such, may be relatively quick and easy to restore. In contrast, the microservice 302b is dependent on microservices 302c, 302d, 302e, and 302f. As such, the microservice 302b may be relatively more difficult and/or time consuming to restore than the microservice 302a. Thus, even though the microservices 302a and 302b are both user-facing and, thus, relatively higher priority than other microservices of application a302, microservice 302a may be assigned a relatively higher priority for restoration, as between microservices 302a and 302b, in view of the considerations just mentioned.

As a further example, microservice 302f is a low level microservice of the application 302. However, if the microservice 302f should fail for any reason, higher level microservices 302c, 302d, and 302b would likewise fail, since those microservices are all dependent upon microservice 302f. Thus, in some circumstances, microservice 302f may be assigned a relatively higher restore priority than the other microservices of the application 302, since the failure of microservice 302f has a relatively wide-ranging impact within the application 302. That is, interdependent services may have far reaching and complex effects, due to their dependent nature, and as such, it may be desirable in some cases to restore interdependent services before restoring independent services.

As a final example, a microservice which requires high speed storage may be restored first. On the other hand, a microservice with low performance requirements, that is, which may not need high speed storage, may first be run directly from protection storage and restored to primary storage later, that is, after the restoration of the microservice that requires the high speed storage.

D. Example Backup Policies and Processes

As disclosed herein, by leveraging the application detection mechanisms, the system can detect which persistent volumes and which services belong to a single application. The system can then create a backup plan which will back up all the persistent data of an application along with the meta data related to the services which build the application and the configuration of the application. Being able to discover the importance of each service can lead to a different backup policy for each service, for example persistent data of important services may be backed up once an hour, while persistent data of less important services may be backed up every day. This can lead to less storage use and less load on the protection storage.

Figure 4:
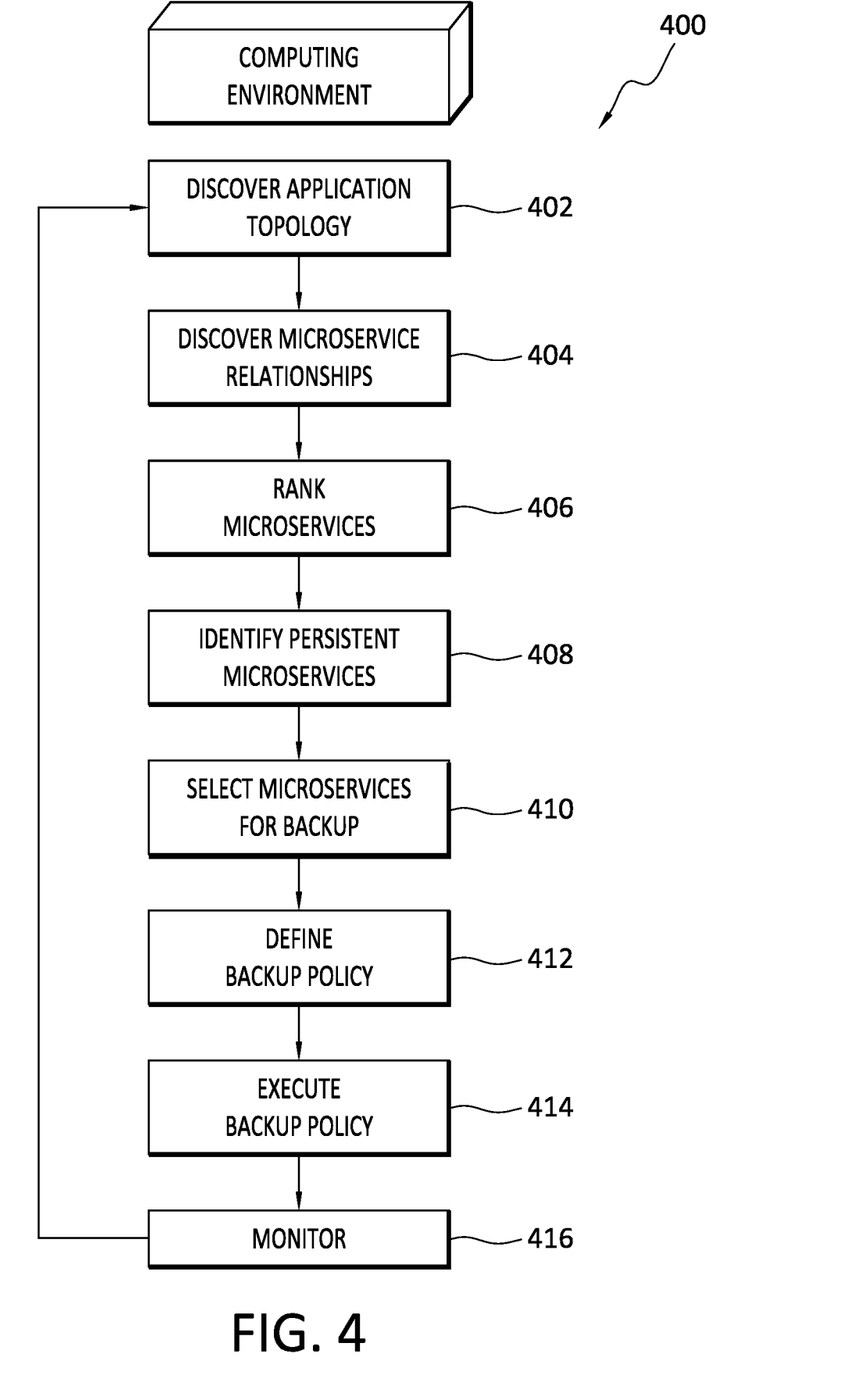
FIG. 4 is a flow diagram directed to an example method for creating and implementing a backup policy.

With reference now to FIG. 4, details are provided concerning methods for creating and executing an automated backup policy, one example of which is denoted generally at 400. The method 400 may be performed in whole, or in part, at a cloud computing environment, or any other computing environment, where one or more cloud native applications are deployed. In some embodiments, the method 400 is performed in whole, or in part, by a backup and restore module, although that is not necessarily required. While the various processes of the method 400 are indicated in a particular order in FIG. 4, the scope of the invention is not so limited and the order of performance may be different in other embodiments. For example, in one alternative embodiment, the persistent microservices may be identified before they are assigned importance levels. As well, in some embodiments, one or more of the processes of the method 400 may be omitted. For example, importance levels may be preassigned to the microservices, so that such assignment need not be performed during creation of the backup policy.

The method 400 may begin at 402 where the topology of an application, such as a cloud native application for example, is discovered. In at least some embodiments, the topology discovery 402 may be performed by, or in connection with, a platform API, such as the Kubernetes API for example. That is, a user can execute a GET on the Kubernetes API and obtain information concerning the application. Such information may include, for example, an identification of the various microservices that make up the application, as well as information concerning the various parts of each microservice. Examples of microservice information that can be obtained by way of a platform API are discussed above in connection with FIG. 3.

In some instances at least, the application topology may not provide all the information needed to generate a backup policy. Accordingly, the method 400 may advance to 404 where microservice relationships are discovered. In some embodiments, discovery of the microservice relationships 404 may be performed through the use of a service mesh, such as Istio for example. The discovery 404 may determine, for example, which microservices are dependent upon one or more other microservices. Such discovery 404 may also identify which microservices are independent of any other microservices. Some examples of independent, and dependent, microservices are disclosed in FIG. 3, discussed above. As well, the discovery 404 may identify one or more microservices that are constituent elements of multiple different applications.

When the various microservices and their relationships, if any, have been discovered 404, the method 400 may then advance to 406 where the various discovered microservices are ranked relative to each other. In at least some embodiments, the microservices 406 are ranked by their relative importance. For example, a user-facing microservice may be ranked relatively higher than a microservice that operates internally to the application and is not user-facing.

After the microservices have been ranked 406, a determination may then be made as to which of the microservices are persistency microservices 408. As noted elsewhere herein, a persistency microservice refers to a microservice that creates and/or uses persistent data and/or metadata. Because the data and metadata, in the case of a persistency microservice, is persistent, there may be a need to back up the persistent data and metadata in case a problem is experienced with the persistency microservice, and/or the persistent data and/or metadata is lost, compromised, or otherwise inaccessible. Microservices that are not persistency microservices may generate and/or use only ephemeral data that is not needed to be protected. The persistent data may be stored on external databases or other external services or persistent volumes attached to the containers As a result of the performance of the method 400 thus far, the identified microservices include one or more microservices that (i) are persistency microservices, and (ii) have been ranked, relative to each other and/or relative to some particular standard, in some way. In at least some cases, it may be desired to back up all persistency microservices, even the relatively low, or lowest, ranking persistency microservices. In other cases, it may be desired to only back up the highest ranked persistency microservices. In still other cases, all of the persistency services may be backed up together. More generally, the persistency microservices that are to be backed up may be selected 410 in any way, based on any criteria.

In any case, when the persistency microservices have been ranked and selected 410, the backup policy for those persistency microservices can then be determined 412. As used herein, backup of a persistency microservice includes backup of persistent data and/or persistent metadata generated and/or used by that persistency microservice.

One example backup policy that may be generated 412 is a backup policy that, when implemented, backs up all persistency microservices that have been identified 408. A backup policy may specify that the persistency microservices are all to be backed up at the same time. As another example, a backup policy may specify that a group or subset of persistency microservices, such as the highest priority microservices for example, are to be backed up (i) before, or after, any other persistency microservices, and/or (ii) all together. As well, a backup policy may specify when and/or how frequently one or more persistency microservices should be backed up. Thus, for example, relatively more important persistency microservices may be backed up more frequently than less important persistency microservices. The foregoing, and/or other, considerations may be combined in any way to define still other backup policies.

More generally, a backup policy may be created/modified 412 that is based on the information obtained by way of one or more of the processes 402 through 410. However, the scope of the invention is not limited to the example backup policies and backup policy parameters disclosed herein.

Finally, at 414, the backup policy may be executed. The backup policy may be executed 414 a single time, or on a recurring, or other, basis. As well, a monitoring process 416 may be performed from time to time to determine whether or not the backup policy should be modified as changes occur with respect to one or more of the microservices that are addressed by the backup policy. Such changes in the system may be identified by use of a platform API as at 402 and/or by use of service mesh as at 404, and may include modification, addition, or removal, of one or more microservices.

E. Example Restore Policies and Processes

Figure 5:
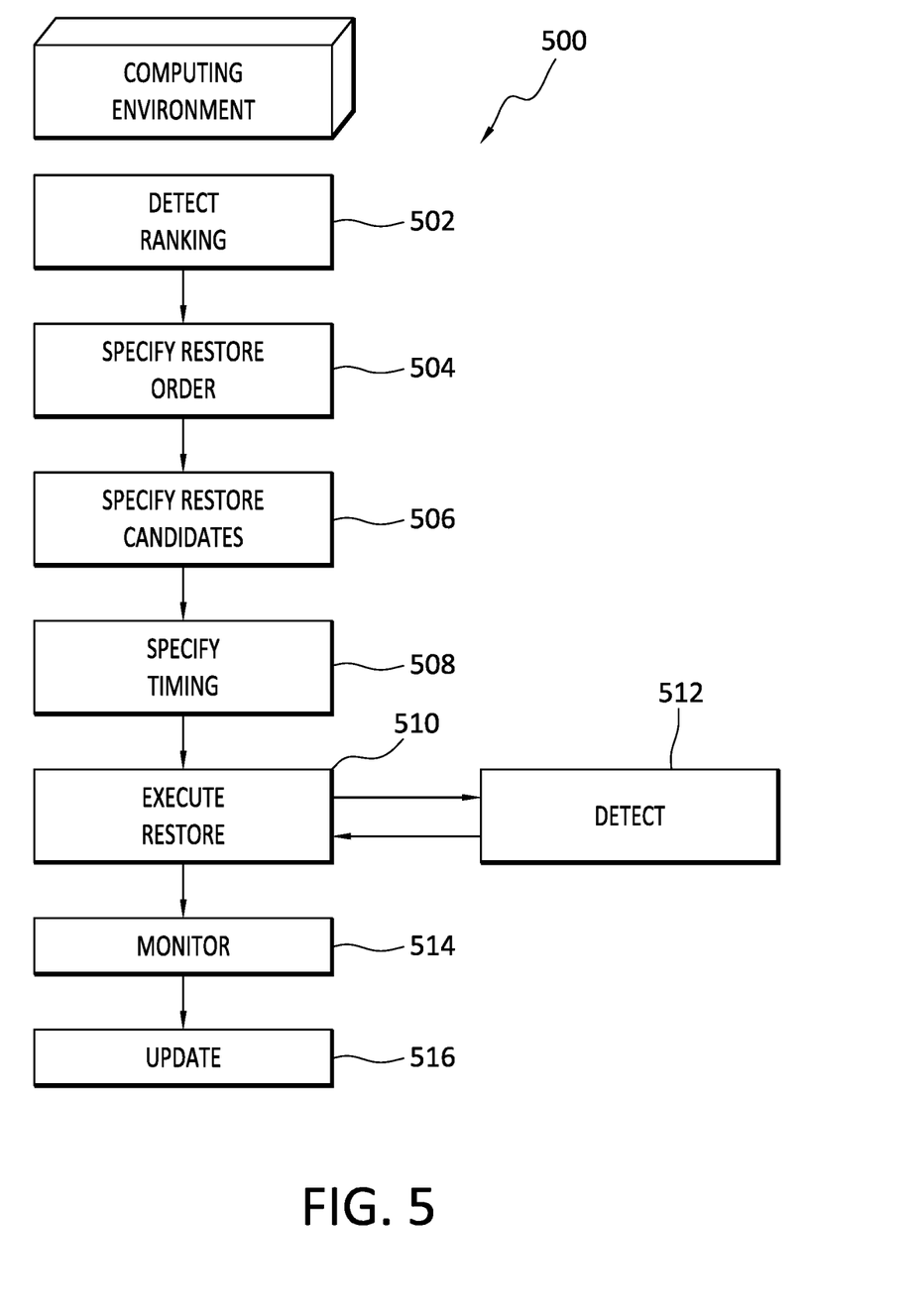
FIG. 5 is a flow diagram directed to an example method for creating and implementing a restore policy.

With reference now to FIG. 5, details are provided concerning methods for creating and executing a smart restore policy, one example of which is denoted generally at 500. The method 500 may be performed in whole, or in part, at a cloud computing environment, or any other computing environment, where one or more cloud native applications are deployed. In some embodiments, the method 500 is performed in whole, or in part, by a backup and restore module, although that is not necessarily required. While the various processes of the method 500 are indicated in a particular order in FIG. 5, the scope of the invention is not so limited and the order of performance may be different in other embodiments. For example, in one alternative embodiment, the candidate persistent microservices for restoration may be identified before the order of their restoration is determined. As well, in some embodiments, one or more of the processes of the method 500 may be omitted.

After a backup policy has been created (see, e.g., FIG. 4), and a ranking of the persistency microservices, such as by order of importance for example, is detected, a smart restore policy can be created and implemented. Example restore policies may specify, for example, the specific persistency microservices that are to be restored, the order in which the persistency microservices will be restored, and when the restore operation is to be performed. A restore policy may specify whether a group of microservices will be restored together, or separately. A restore policy may specify the target to which persistent data and/or metadata will be restored. The foregoing, and/or other, considerations may be combined in any way to define still other restore policies.

The method 500 may begin at 502 where the rankings of one or more persistent microservices to be addressed by the restore policy are detected. In some embodiments, the ranking information may be gleaned from one or more backup policies. With the ranking information in hand, the restore order for the various microservices can then be defined 504. A variety of considerations may inform the specification of the restore order 504.

For example, when restoring an entire cluster, it may be desirable to restore relatively more important applications first. The more important applications may be as defined by a user, or may be automatically detected and defined based on, for example, workloads associated with the applications and/or based on a machine learning (ML) algorithm that takes IOs and/or other parameters into consideration to determine the relative importance of one or more applications. As the foregoing suggests, in conjunction with, or before/after, determining the restore order 504, the particular candidates to be restored are also identified 506.

Another consideration that may be addressed when restoring an entire cluster is which parts of each application should be restored first, that is, the timing 508 of the restore processes. Thus, for example, a restore policy may specify that the application parts, that is, the persistency microservices, should be restored in an order inverse to the respective expected usage of the persistency microservice. Thus, for example, persistency microservices which have low workload can start running directly from the protection storage, and can be restored later than persistency microservices with higher workloads.

The relative importance for restore order may also be determined with reference to when the various persistent microservices are next expected to be needed. For example, if a database of a persistency microservice is not expected to be used soon, such as for at least a month, that persistency microservice may have a relatively lower restore priority than another persistency microservice. As another example, the restore order specified in a restore policy may be based on the nature of the various microservices. For example, a user-facing microservice may be restored before a non-user-facing microservice is restored. Also if a service does not need fast storage, that service may initially be run directly from the protection storage and restored to primary storage later, whereas, and run, prior to restoration of the other service to primary storage.

When particular candidates for restoration are identified 506, those candidates can be examined at a more granular level to determine which elements of the persistency microservice are to be restored first. For example, critical elements of the persistency microservice may be restored before restoration of a sidecar that monitors the persistency microservice on Kubernetes.

In identifying restore policy candidates for restoration 506, various other considerations may be taken into account. For example, restoration may be performed only for the parts of the persistent microservices that are necessary. To illustrate, and with reference to the example of the OSB API, a remote persistent microservice is not restored if it never failed. As another example, and with reference to federated snapshots, if a cluster is still running, then that cluster will not be restored. In another case, if the container registry for a persistent microservice, pod, or cluster, is not available, then the container registry should be restored.

As a final example of considerations that may be taken into account when identifying restore candidates for a restore policy, the restore policy may account for any dependencies between persistency microservices. For example, and as noted in the discussion of FIG. 3, a user may create a dependency graph between persistency services which will describe which persistency services need to be restored together. If the design is correct, each persistency service can be restored separately. But if there is dependency between/among persistency microservices, the system will restore dependent persistency services together, even if only fewer than all of the persistency services failed. On the other hand, independent persistency services which have not failed do not need to be restored.

Finally, execution of a restore policy 510 may be held in abeyance until such time as a need for performance of the restore process is detected 512. Detection of a need to perform a restore process can be implemented in a variety of ways, and may be based on a variety of considerations. For example, an entity such as a backup/restore module may be connected with, for example, monitoring and eventing systems that detect Kubernetes failures/degradations. As well, backup and restore functionalities can be implemented as part of the lifecycle of an application/persistency microservice so that those processes are performed as a matter of course as specified in a policy, and not simply performed on-demand.

Whether or not there is a need to perform a restore process can also be based on a risk assessment with respect to the backup/restore system and/or with respect to the enterprise. For example, if a failure to restore a particular persistency microservice presents a relatively low risk, that restore process may be omitted, or performed only after all other persistency microservices have been performed. As another example, if the persistency microservice is expected to be replaced, or deleted, in the near future, a restore process may not be necessary.

As some further examples, partial data may be restored if some of the associated microservices are not corrupted. As well, restores may be made directly from secondary storage if the restored service does not require high performance. Further, services more likely to be used first by an application may be restored first, that is, prior to services that are unlikely to be used soon by the application.

Finally, automatic restores may be performed in at least some circumstances. For example, the system may automatically restore persistency microservices which have been detected as failed even before service is actually used again. Thus, embodiments of the invention may implement self-healing functionality in which the system can recover from a failure before the failure has an effect on the system.

With continued reference to FIG. 5, the method 500 may also involve ongoing, or ad hoc, monitoring 514 to keep apprised of changes in the applications which may implicate one or more changes to a restore policy. In the event that a change occurs to an application that implicates a restore policy, the restore policy may then be updated 516 accordingly. For example, if a persistency service is removed from the application, the restore policy can be updated 516 to reflect that the persistency service need not be restored.

F. Example Host and Server Configurations

Figure 6:
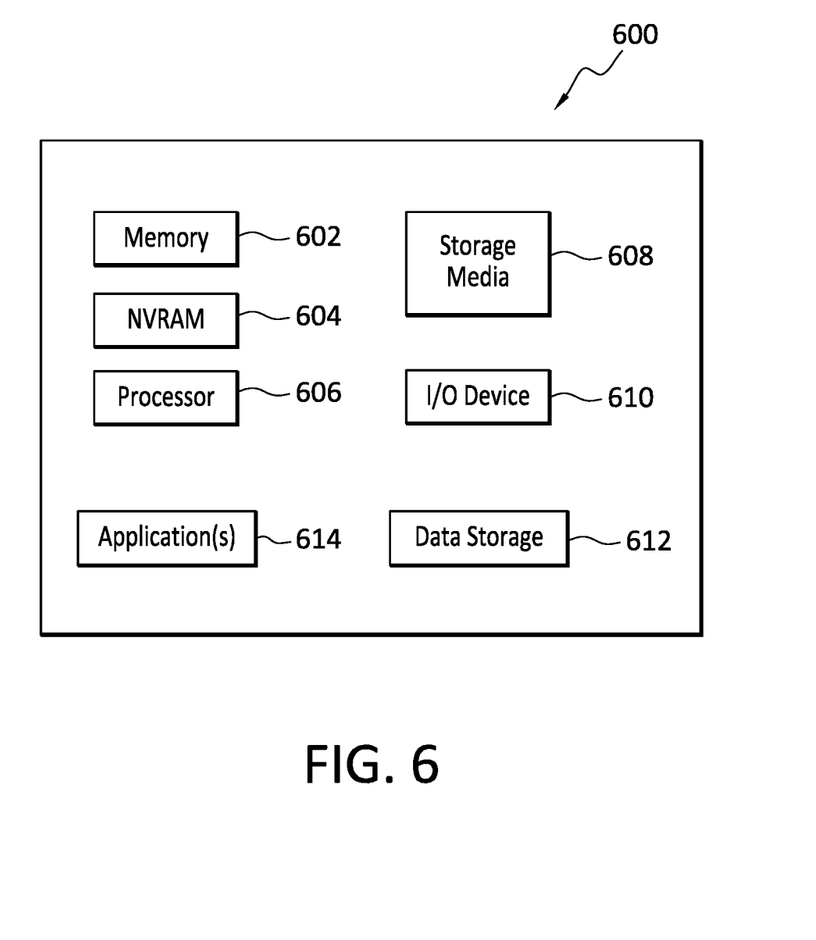
FIG. 6 discloses aspects of an example host device.

With reference briefly now to FIG. 6, any one or more of the operating environment 100, cloud native applications 102 . . . 106, backup and restore module 150, applications 302, 304 and 306, and microservices 302a . . . 302f, and 304a . . . 304c, and 306a . . . 306d, can take the form of, include, and/or be hosted by, a physical computing device, one example of which is denoted at 600. As well, where any of the aforementioned elements comprise or consist of a virtual machine (VM), that VM may constitute a virtualization of any combination of the physical components disclosed in FIG. 3.

In the example of FIG. 6, the physical computing device 600 includes a memory 602 which may comprise one, some, or all, of random access memory (RAM), non-volatile random access memory (NVRAM) 604, read-only memory (ROM), and persistent memory, one or more hardware processors 606, non-transitory storage media 608, I/O device 610, and data storage 612. One or more of the memory components 602 of the physical computing device can take the form of solid state device (SSD) storage. As well, one or more applications 614 are provided that comprise executable instructions. Such executable instructions can take various forms including, for example, instructions executable to perform any method or portion thereof disclosed herein. Such instructions may be executable by/at any of a cloud computing site, cloud datacenter, client, backup/restore module, backup server, restore server, or any other entity, to perform one or more functions of one or more microservices alone or in cooperation with one or more other microservices, functions of a cloud native application, and functions of a backup/restore module as disclosed herein. As well, such instructions may be executable to perform read, write, backup, and restore operations.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory storage medium having stored therein instructions which are executable by one or more hardware processors to perform operations comprising:
   discovering a topology of a microservice;
   discovering a topology of an application, and discovering the application topology comprises identifying a group of microservices, including the microservice, that are components of the application;
   discovering relationships between the microservices in the group of microservices that were identified during the discovering of the application topology, and discovering relationships between the microservices comprises discovering whether a microservice in the group of microservices is dependent upon, or independent of, another microservice in the group of microservices;
   identifying a sub-group of persistency microservices in the group of microservices;
   ranking the persistency microservices of the sub-group of persistency microservices;
   selecting one or more of the ranked persistency microservices for backup; and
   defining a backup policy based on the microservice relationships, the persistency microservice rankings, and the selected persistency microservices, and the backup policy, when executed, causes backup of the one or more persistency microservices.

2. The non-transitory storage medium as recited in claim 1, wherein the persistency microservices are ranked according to their importance relative to each other.

3. The non-transitory storage medium as recited in claim 1, wherein, in operation, one of the persistency microservices generates new and/or modified data and/or metadata that is persistently stored.

4. The non-transitory storage medium as recited in claim 1, wherein discovery of the application topology is performed with a platform application program interface (API).

5. The non-transitory storage medium as recited in claim 1, wherein the platform API is a Kubernetes API.

6. The non-transitory storage medium as recited in claim 1, wherein discovery of relationships between microservices is performed with a service mesh.

7. The non-transitory storage medium as recited in claim 1, wherein the application topology is a topology of a cloud native application.

8. The non-transitory storage medium as recited in claim 1, wherein the operations further comprise performing a backup operation based on the backup policy.

9. The non-transitory storage medium as recited in claim 8, wherein performing the backup operation comprises backing up persistent data and/or persistent metadata generated and/or modified by one or more of the persistency microservices.

10. The non-transitory storage medium as recited in claim 1, wherein the operations further comprise:
    detecting respective rankings of the persistency microservices; and
    defining a restore policy concerning the microservices, wherein defining the restore policy comprises:
        specifying a restore order for the microservices, and a restore order for the persistency microservices is specified based on the respective rankings of the persistency microservices;
        identifying microservices that are candidates for restoration; and
        specifying timing of a restore for each of the candidates.

11. The non-transitory storage medium as recited in claim 10, wherein the persistency microservices are ranked according to their importance relative to each other, and the operations further comprise restoring the candidates in order of their rank.

12. The non-transitory storage medium as recited in claim 10, wherein each of the restore candidates is a respective one of the persistency microservices, and each of the persistency microservices is associated with respective persistent data and/or persistent metadata.

13. The non-transitory storage medium as recited in claim 10, wherein the operations further comprise restoring the restore candidates according to the restore policy.

14. The non-transitory storage medium as recited in claim 13, wherein restoring the restore candidates comprises restoring a failed persistency microservice before the failed persistency microservice impairs operation of an application of which that persistency microservice is an element.

15. The non-transitory storage medium as recited in claim 13, wherein restoring the restore candidates comprises restoring multiple microservices together.

16. The non-transitory storage medium as recited in claim 13, wherein restoring the restore candidates comprises restoring one of the restore candidates directly from secondary storage.

17. The non-transitory storage medium as recited in claim 13, wherein as between first and second restore candidates, the first restore candidate is more likely to be used by an application before the second restore candidate is likely to be used by the application, and restoring the restore candidates comprises restoring the first restore candidate before restoring the second restore candidate.

18. The non-transitory storage medium as recited in claim 13, wherein restoring the restore candidates comprises restoring less than all of the microservices.

19. The non-transitory storage medium as recited in claim 13, wherein one of the restore candidates is run from protection storage prior to being restored to primary storage.

* * * * *